United States Patent [19]

Rodgers et al.

[11] 4,237,735
[45] Dec. 9, 1980

[54] BALANCING APPARATUS

[76] Inventors: Kenneth W. Rodgers, 809 Moall Dr., Prescott, Ariz. 86301; Frank J. Knize, 2736 Loos Ct., Prescott Valley, Ariz. 86312

[21] Appl. No.: 956,630
[22] Filed: Nov. 1, 1978
[51] Int. Cl.³ ............................................. G01M 1/12
[52] U.S. Cl. ................................................... 73/486
[58] Field of Search ................. 73/486, 482, 483, 484, 73/485, 459; 308/2 R

[56] References Cited
U.S. PATENT DOCUMENTS

| 2,172,006 | 9/1939 | Buckner et al. | 73/486 |
| 3,036,468 | 5/1962 | Anderson | 73/486 |
| 3,148,546 | 9/1964 | Karig | 73/486 |
| 4,048,858 | 9/1977 | Mitchell | 73/486 |
| 4,075,891 | 2/1978 | Roberts, Jr. | 73/483 |

Primary Examiner—Jerry W. Myracle
Attorney, Agent, or Firm—Harry M. Weiss

[57] ABSTRACT

This disclosure relates to an improved balancing apparatus and method which is especially useful for balancing tires for cars, trucks, etc. The improved balancing apparatus of this disclosure comprises a lifting mechanism including object holding elements for lifting and holding the object or tire that is to be balanced, balance indicating elements for indicating the extent that the object or tire to be balanced is out of balance, and X-Y adjusting elements which are connected to the lifting elements and provides a free-floating arrangement for the balancing of the object or tire. In the disclosed embodiment of balancing a tire, the improved balancing apparatus is coupled or connected to the hub of a tire by means of bolts which releasably connect a plate located at the bottom of the lifting elements and the hub of the tire to be balanced. The balancing is completed by the use of weights attached to the rim around the hub portion of the tire in accordance with the degree of unbalance shown by the balance indicating elements which displays the unbalance of the tire in two orthogonal directions.

11 Claims, 5 Drawing Figures

U.S. Patent   Dec. 9, 1980   4,237,735
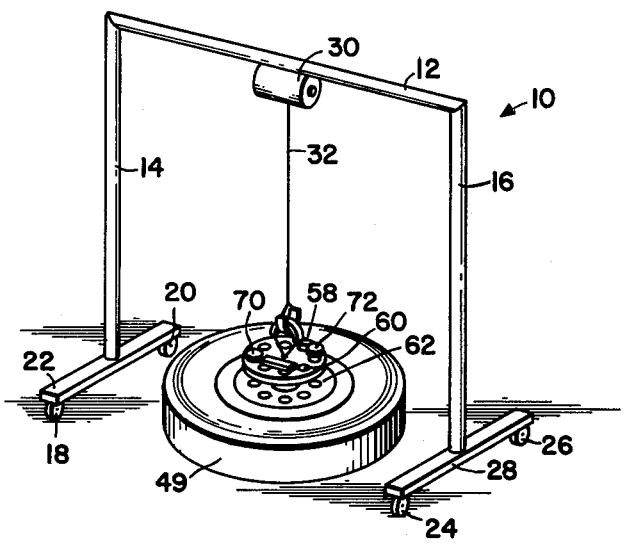
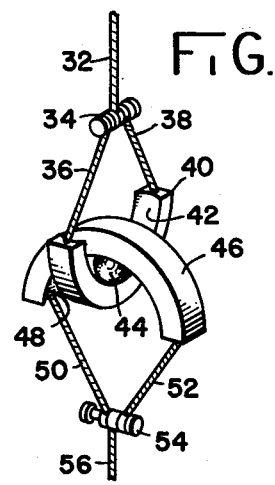
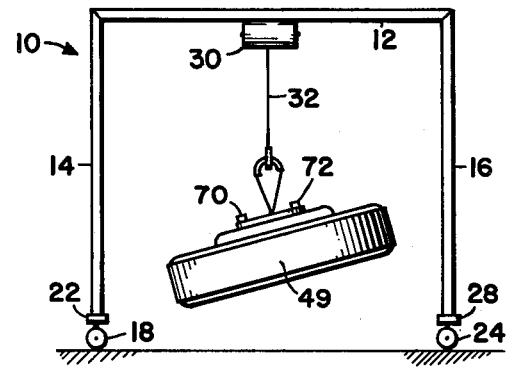
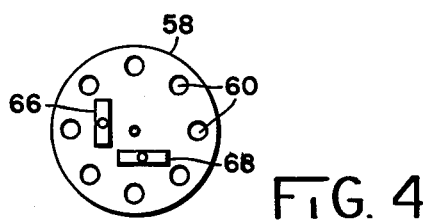
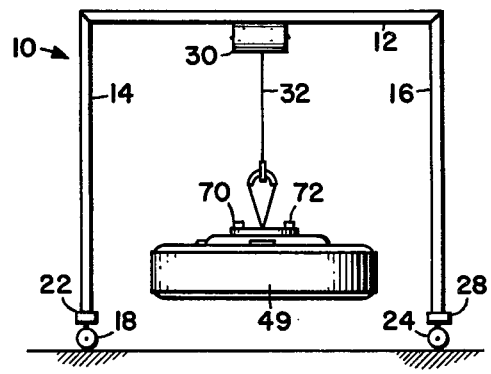

BALANCING APPARATUS

BACKGROUND OF THE INVENTION

1. Field of the Invention

This invention relates generally to balancing apparatus and methods and, more particularly, relates to tire balancing apparatus and methods for balancing tires for automobiles, trucks, etc.

2. Background of the Prior Art

In the past, various techniques have been developed for balancing objects such as tires for cars, trucks, etc. This form of technology in the balancing of tires, which is extremely critical from both a safety and comfort point of view, started out with relatively simple wheel-balancing apparatus and methods and, as these become inadequate to effectively and properly balance tires, especially large, heavy truck type tires, this balancing technology became much more sophisticated and complex mechanisms such as spin-balancing equipment were developed in an attempt to balance tires.

In the art of balancing tires it has been discovered that it is much easier to accurately balance smaller tires such as for use on passenger cars than to balance larger tires for use on trucks, buses, etc. One reason for this is that the tires for use on passenger cars do not receive the same amount of stress, strain and forces that are placed on truck tires which are supporting much greater weights or loads. Thus the necessity for achieving an optimum balance on a passenger tire is much less than it is for larger tires for use on trucks, buses and the like. Accordingly, truck type tires, for example, must be very carefully balanced to avoid the dangerous and uncomfortable shimmying and vibration action that occurs when large trucks having unbalanced or improperly balanced tires are going at speeds close to 50 miles an hour. Heretofore, it has been very difficult to very accurately balance truck type tires on a continuous basis so that they can be used without shimmying or vibrating at speeds of approximately 50 miles an hour.

Accordingly, a need existed to develop a simple, reliable, efficient and rapid technique for balancing objects such as automobile and truck tires.

SUMMARY OF THE INVENTION

Accordingly, it is an object of this invention to provide an improved balancing apparatus and/or method.

It is still a further object of this invention to provide an improved balancing apparatus and/or method suitable for use in balancing tires.

It is still another object of this invention to provide an improved balancing apparatus and/or method suitable for use in balancing large tires such as truck tires.

The foregoing and other objects, features and advantages of this invention will be apparent from the following more particular description of the preferred embodiments of the invention as illustrated in the accompanying drawings.

BRIEF DESCRIPTION OF THE FIGURES

FIG. 1 is a perspective view of one embodiment of this invention showing the improved balancing apparatus with a tire located beneath a coupling or attaching plate that is used to attach the tire to the improved balancing apparatus.

FIG. 2 is an enlarged perspective view showing the X-Y adjustment mechanism that is used as part of the improved balancing apparatus of FIG. 1.

FIG. 3 is a front or back elevational view showing a tire suspended from and attached to the improved balancing apparatus of FIG. 1 and further illustrating the tire being tilted to signify that it is unbalanced.

FIG. 4 is a top view of the coupling or attaching plate used as part of the improved balancing apparatus of FIG. 1 showing the orthogonal balance indicators located on the coupling or attaching plate.

FIG. 5 is an elevational view similar to FIG. 3 but showing the tire in a balanced condition.

DESCRIPTION OF THE SPECIFICATION

Referring to FIG. 1, an improved balancing apparatus is generally designated by reference numeral 10. The improved balancing apparatus 10 comprises a horizontal support bar or member 12 which preferably is made of a sturdy material such as a steel rod, and a pair of vertical members 14 and 16 which are connected (such as by welding) to the horizontal member 12 and are also preferably made of a sturdy material such as a steel rod. In some applications, the vertical members 14 and 16 need not be used where it is desired to suspend the improved balancing apparatus 10 from a horizontal bar or plate or other support member.

For ease of portability, a pair of rollers 18 and 20 are rotatably attached to a support plate 22 which is connected to the vertical support member 14. Similarly, a pair of rollers 24 and 26 are rotatably connected to a support plate 28. The support plate 22 and the support plate 28 are, respectively, connected to the vertical support members 14 and 16 such as by welding if all the members are made of a metal such as steel. Thus the entire improved balancing apparatus 10 can be wheeled from place to place as desired.

Mounted below the horizontal bar 12 and connected thereto (such as by welding) is a winch 30 which is either hand operated or powered by an electric motor, as desired. Thus the winch 30 raises or lowers, as desired, a cable 32 preferably made of metal such as steel. Attached to the bottom end of the cable 32 is a cable terminating, rod-shaped member 34 (see FIG. 2) which serves the dual function of providing a termination for the end of the cable 32 that is connected thereto as well as to permit the ends of cable portions 36 and 38 (preferably also made of steel cable) to be connected and held thereto. The other ends of the cable portions 36 and 38 are connected (such as by welding or other suitable fastening techniques) to a first semi-circular or arcuate shaped race member 40 which has a slot or groove 42 for serving as a bearing surface for permitting ball bearing 44 to move along the ball bearing slot, groove or channel 42. A similar second semi-circular or arcuate shaped member 46 is orthogonally mounted over the arcuate shaped member 40 and is also in contact with the ball bearing 44. The arcuate shaped member 46, like the arcuate shaped member 40, has a bearing slot, groove or channel 48 which is the same as the bearing slot 42 of the arcuate shaped member 40. Thus the ball bearing 44 (which is preferably a single steel ball) rotates and moves in an X-Y direction along either the slot 42 or along the slot 48 of the semi-circular members 40 and 46, respectively. This X-Y motion is important to the improved balancing apparatus 10 because it permits X-Y free-floating of tire 49 (see FIG. 3) so that unbalanced objects such as the tire 49 that are to be balanced can be effectively free-floated with minimum resistance in either the X or Y (orthogonal) horizontal directions as shown more clearly with respect to FIG. 3.

Cable portions 50 and 52 (see FIG. 2) are similar to the cable portions 36 and 38 except that they are connected to the end portions of the semi-circular member 46. The means of connection is the same as the means of connection for the cable portions 36 and 38 to the member 40. The cable portions 50 and 52 are connected at their other ends to a terminating rod-shaped member 54 which is similar in function and operation as the terminating rod-shaped member 34 that is connected to the bottom of the cable 32 and to the cable end portions 36 and 38. Thus, the terminating rod-shaped member 54 is connected in a similar manner to the cable portions 50 and 52 and to a short cable portion 56. The short cable portion 56 is secured at the bottom end thereof to a coupling or attaching plate 58 (see FIG. 1 and 4). The coupling plate 58 is preferably a hub portion of a tire which can be formed by cutting away and using a hub portion from an existing tire hub.

Referring to FIG. 4, the coupling plate 58 has a series of openings 60 located around the periphery thereof which, because of the fact that it is cut from a tire hub, matches the corresponding openings in a tire hub 62 located in the tire 49 that is to be balanced (see FIG. 1). For example, a ten hole Budd wheel can be used as the coupling plate 58, or is desired, a Dayton wheel hub can be used and connected by other suitable means than bolts to the similar hub of the tire to be weighed.

In the enlarged view of the coupling plate 58 as shown in FIG. 4 a pair of balance indicator means 66 and 68 are shown which are located in orthogonal relationship to each other. The balance indicator means 66 and 68 are preferably bubble indicator devices which identify the amount or degree of unbalance of the tire 49 based upon the position of each bubble within each of the balance indicator means 66 and 68. For example, a perfect balance is achieved when the bubble within the balance indicator means 66 is directly in the center of this indicator means and, similarly, the bubble in the balance indicator means 68 is in the center of this indicator means. If the tire 49 is unbalanced, the balance indicator means 66 and 68 would reflect this and the bubble located in one or the other, or both, of the balance indicator means 66 and 68 would not be in the center thereof. Thus, balancing of the tire 49 can rapidly and reliably be achieved using the orthogonal balance indicator means 66 and 68 as a guide.

Referring to FIGS. 1, 3 and 5, a pair of bolts 70 and 72 are used to couple or attach the hub 62 of the tire 49 to the coupling plate 58 due to the threaded connection between the bolts 70 and 72 which extend through two openings 60 in the coupling plate 58 and are secured to two corresponding openings in the hub 62 of the tire 49.

Accordingly, as shown more graphically in FIG. 3, the attachment of the tire 49 to the coupling plate 58 of the improved balancing apparatus 10 permits the tire 49 to attain both a suspended and a free-floating position due to the function of the X-Y positioning mechanism or means (the semi-circular members 40 and 46 and the intermediate rotating ball bearing 44).

Referring to FIG. 5, reliable and accurate balancing of the tire 49 is visually observed and rapidly achieved by simply dropping weights onto the raised portion of the hub 62 of the tire 49 and attaching the weights to the rim of the hub 62 of the tire 49 when the bubble indicator means 66 and 68 show the bubbles located in the center thereof.

While the invention has been particularly described and shown in reference to the preferred embodiments thereof it will be understood by those skilled in the art that various changes in form and detail and omissions may be made therein without departing from the spirit and scope of the invention.

What is claimed:

1. An improved balancing apparatus especially useful for balancing an object having at least first and second orthogonal horizontal axes comprising, in combination, lifting means for lifting the object into a suspended position; and X-Y adjustment means connected to said lifting means for permitting the object to assume a free floating position about both of said axes to indicate the degree of unbalance of the object with respect to the center thereof, said X-Y adjusting means comprises a first arcuate shaped member, a second arcuate shaped member spaced from said first arcuate shaped member, said first arcuate shaped member and said second arcuate shaped member each having a bearing surface, and bearing means located between said first arcuate shaped member and said second arcuate shaped member for rotatably moving along said bearing surface of at least one of said first and second arcuate shaped members.

2. An improved balancing apparatus especially useful for balancing on object comprising, in combination, lifting means for lifting the object into a suspended position; and X-Y adjustment means coupled to said lifting means for permitting the object to assume a free-floating position about two orthogonal horizontal axes thereof to indicate the degree of unbalance of the object with respect to its center, said X-Y adjustment means comprising a first arcuate shaped member, a second arcuate shaped member spaced from said first arcuate shaped member, said first and second arcuate shaped members each having a bearing surface, and a single ball bearing located between said first arcuate shaped member and said second arcuate shaped member for rotatably moving along the bearing surface of at least one of said first and second arcuate shaped members, said first arcuate shaped member being orthogonally located with respect to said second arcuate shaped member, said first and second arcuate shaped members each having an inner curved portion and an outer curved portion, said inner curved portion of said first arcuate shaped member facing said second arcuate shaped member, and said inner curved portion of said second arcuate shaped member facing said first arcuate shaped member.

3. An improved balancing apparatus in accordance with claim 2 wherein said lifting means includes object attaching means for attaching the object to be lifted by said lifting means.

4. An improved balancing apparatus in accordance with claim 3 including balance indicating means connected to said object attaching means for indicating the degree and direction of unbalance of the object to be lifted by said lifting means.

5. An improved balancing apparatus in accordance with claim 4 wherein said balance indicating means comprises a pair of orthogonal positioned balance indicating devices.

6. An improved tire balancing apparatus having at least first and second orthogonal horizontal axes comprising, in combination, lifting means for lifting a tire into a suspended position; and X-Y adjustment means connected to said lifting means for permitting the tire to assume a free floating position about both of said axes to indicate the degree of unbalance of the tire with respect to the center of the hub thereof, said X-Y adjusting means comprises a first arcuate shaped member, a second arcuate shaped member spaced from said first arcuate shaped member, said first arcuate shaped member and said second arcuate shaped member each having a bearing surface, and bearing means located between said first arcuate shaped member and said second arcuate shaped member for rotatably moving along said bearing surface of at least one of said first and second arcuate shaped members.

7. An improved tire balancing apparatus comprising, in combination, lifting means for lifting the tire into a suspended position; and X-Y adjustment means coupled to said lifting means for permitting the tire to assume a free-floating position about two orthogonal horizontal axes thereof to indicate the degree of unbalance of the tire with respect ot the center of the hub thereof, said X-Y adjustment means comprising a first arcuate shaped member, a second arcuate shaped member spaced from said first arcuate shpaed member, said first and second arcuate shaped members each having a bearing surface, and a single ball bearing located between said first arcuate shaped member and said second arcuate shaped member for rotatably moving along the bearing surface of at least one of said first and second arcuate shaped members, said first arcuate shaped member being orthogonally located with respect to said second arcuate shaped member, said first and second arcuate shaped members each having an inner curved portion and an outer curved portion, said inner curved portion of said first arcuate shaped member facing said second arcuate shaped member, and said inner curved portion of said second arcuate shaped member facing said first arcuate shaped member.

8. An improved tire balancing apparatus in accordance with claim 7 wherein said lifting means comprises tire attaching means for attaching the tire to be lifted by said lifting means.

9. An improved tire balancing apparatus in accordance with claim 8 including balance indicating means connected to said tire attaching means for indicating the degree and direction of unbalance of the tire to be lifted by said lifting means.

10. An improved tire balancing apparatus in accordance with claim 9 wherein said balance indicating means comprises a pair of orthogonal positioned balance indicating devices.

11. An improved tire balancing apparatus comprising, in combination, lifting means for lifting a tire into a suspended position, said lifting means comprising tire attaching means for attaching the tire to be lifted by said lifting means; balance indicating means connected to said tire attaching means for indicating the degree and direction of unbalance of the tire to be lifted by said lifting means; said balance indicating means comprising a pair of othogonal positioned balance indicating devices; and X-Y adjusting means connected to said lifting means for permittng the tire to assume a free-floating position to indicate the degree of unbalance of the tire with respect to the center of the hub thereof, said X-Y adjusting means comprising a first arcuate shaped member, a second arcuate shaped member spaced from said first arcuate shaped member, said first arcuate shaped member and said second arcuate shaped member each having a bearing surface, and bearing means located between said first arcuate shaped member and said second arcuate shaped member for rotatably moving along said bearing surface of at least one of said first and second arcuate shaped members; and said first arcuate shaped member being orthogonally located with respect to said second arcuate shaped member, said first and second arcuate shaped members each having an inner curved portion and an outer curved portion, said inner curved portion of said first arcuate shaped member facing said second arcuate shaped member, said inner curved portion of said second arcuate shaped member facing said first arcuate shaped member, said ball bearing means being a single ball bearing.

* * * * *